WIRE-WOUND RESISTANCE UNITS

Filed Sept. 30, 1954

INVENTOR.
ROBERT W. TAGGART
BY G. W. O'Brien
F. L. Styner
ATTYS.

United States Patent Office 2,773,159

Patented Dec. 4, 1956

2,773,159

WIRE-WOUND RESISTANCE UNITS

Robert W. Taggart, Indianapolis, Ind.

Application September 30, 1954, Serial No. 459,560

5 Claims. (Cl. 201—63)

(Granted under Title 35, U. S. Code (1952), sec. 266)

The invention described herein may be manufactured and used by or for the Government of the United States of America for governmental purposes without the payment of any royalties thereon or therefor.

The present invention relates to resistance units and more particularly to wire-wound resistance units for use in printed circuits.

Large quantities of wire-wound resistors of various sizes and resistance values are used in present day electronic equipment. One of the design criteria for all types of electronic components is to make the units as small and compact as possible. The use of printed circuitry has greatly facilitated the miniaturization of electronic components, however, heretofore no suitable means were available for connecting wire-wound resistors to printed circuit boards. Also many wire wound resistors have high resistance values which require the use of wire which is only a few thousandths of an inch in diameter, and much difficulty is encountered when relatively heavier wires are fixed to the ends of the small diameter wire.

Heretofore, one well known method of making wire-wound resistors was to wind the small diameter wire around a core, which has a flange on each end thereof, each flange having a groove around its periphery into which a relatively heavy wire could be wound. The heavy wire was twisted so as to form a single tight loop around a flange and then the smaller diameter wire could be soldered to the larger diameter wire.

The above described method of manufacturing wire-wound resistors has several disadvantages in that any manipulation or movement of the heavier wire would often break the small diameter wire, and also the resistor could not be mounted flush against a chassis or terminal board, consequently any vibration or shock would rock the resistor, often causing a break in the electrical circuit.

The present invention eliminates the inherent disadvantages of any heretofore available resistors by providing a resistor form that has heavy wire prongs molded into end flanges of a resistor spool or block. The heavy wire prongs extend diametrically or transversely through each flange, being disposed in parallel relation to each other, and protrude from each side of the flange. The small diameter resistance wire can be looped several times around the top ends of the protruding wire prongs and then soldered or welded to make a good electrical connection. Each flange may have a flat portion thereon so that the resistor unit can be mounted flush against a chassis or terminal board and thus minimize any rocking or moving.

The bottom ends of the protruding wire prongs may be inserted into sockets on a chassis or into eyelets of a printed circuit board. A particular advantage of the present invention is the ability to rapidly insert or remove a particular resistor in an experimental circuit without using a soldering iron. Thus an optimum circuit can be readily determined by plugging in differing value resistors. It is therefore a general object of the present invention to provide a new and novel type of wire-wound resistance unit that is suitably adapted for use in printed circuit boards by providing a resistor form that has integral mounting terminals therein, and means for mounting the resistor flush with a mounting surface.

Other objects and many attendant advantages of this invention will be readily appreciated as the same becomes better understood by reference to the following detailed description when considered with the accompanying drawing in which.

Figure 1:
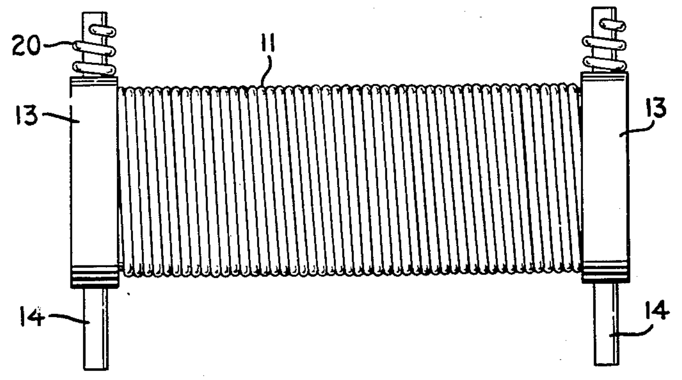
Fig. 1 is a side elevational view showing the complete invention.
Figure 3:
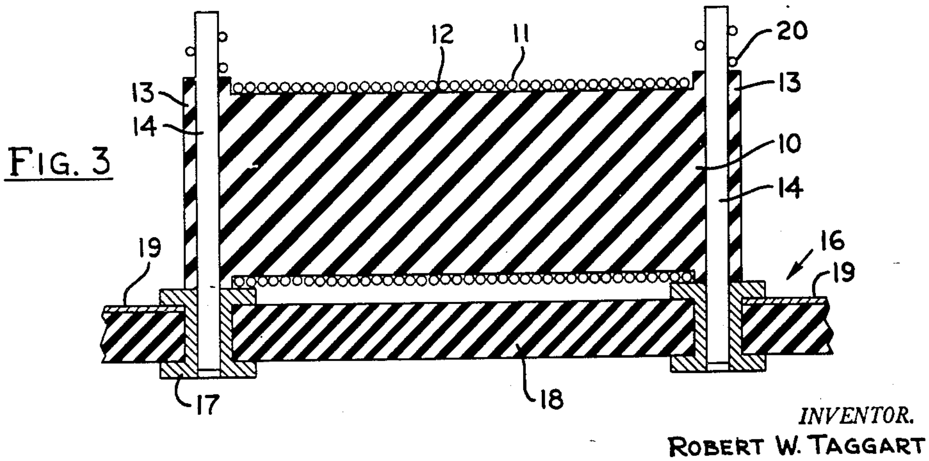
Fig. 3 is a sectional view taken on line 3—3 of Fig. 2 and looking in the direction of the arrows.

Referring now to the drawing, wherein like reference characters designate like or corresponding parts throughout the several views, there is shown in Figs. 1 and 3 of the drawing, a wire-wound resistor having a resistor form 10 upon which is wound a number of turns of small diameter insulated resistance wire 11.

The resistor form 10 may be machined or molded from any suitable dielectric material such as phenolic, ceramic, nylon, or other plastic material, and the length and diameter of the resistor form will, of course, depend upon the particular use for which the resistor is made. Various sizes and shapes of resistor forms might be standardized for use in production, a spool type being shown herein for the purpose of illustrating the invention.

The small diameter insulated resistance wire 11 may be of any commercial type of insulated wire, preferably of the varnish-insulated type, and the diameter and length of wire to be used will depend upon the value of resistance required for a particular electrical circuit.

Figure 2:
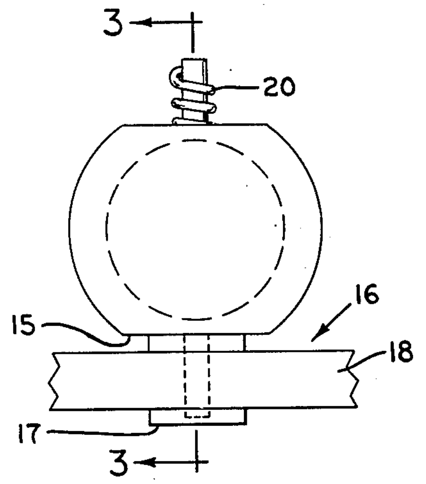
Fig. 2 is an end view showing a wire-wound resistor mounted into a printed circuit board.

The resistor form 10, as shown in Figs. 1 and 3 of the drawing, has an intermediate section 12, upon which the resistance wire 11 is wound, and flanges 13 on each end of the intermediate section 12 that help retain the resistance wire 11 in position. As shown in Fig. 2 of the drawing, each flange 13 has flat portions 15 thereon that can form a solid base when the resistance unit is mounted on a printed circuit board 16. Relatively heavy wire prongs 14, disposed in parallel relation to one another, are fixed diametrically through each flange 13 and protrude radially of the flange 13.

As shown by Figs. 2 and 3 of the drawing, a printed circuit board, which is designated generally by the numeral 16 and which forms no part of the present invention, has eyelets 17 which are properly spaced and permanently mounted through an electrical insulated board 18. The eyelets 17 have inside diameters that are only slightly larger than the outside diameter of the wire prongs 14, and a resistance unit can be plugged into the printed circuit board similar to the plugging-in of a radio tube.

Fig. 3 shows a cross sectional view of a resistor plugged into a printed circuit board 16 wherein it can be seen that conductor means 19 are connected to the eyelets 17, and when a resistance unit is plugged into the eyelets 17 the circuit will be closed.

In the manufacture of a resistance unit of the type described herein, the heavy wire prongs 14 will be permanently connected through each flange 13, preferably being molded integral therein, and will protrude from opposite diametrical portions of the the flange 13. By way of example, one method of completing the resistance unit would be to wrap several loops 20 of resistance wire 11, having the insulation removed therefrom, around the top protruding portion of one wire prong 14 and solder or weld thereto to form a good electrical connection. A required number of turns of resistance wire 11 could then be wound on the intermediate section 12 of the resistor form 10 and then several loops of the remaining end, having the insulation removed therefrom, could be wound around the second wire prong 14 and secured thereto by soldering or welding.

Obviously many modifications and variations of the present invention are possible in the light of the above teaching. It is therefore to be understood that within the scope of the appended claims the invention may be practiced otherwise than as specifically described.

What is claimed is:

1. A resistor form of heat-resistant dielectric material having, an intermediate portion betwen two end flanges, relatively heavy wire prongs molded integral therein and disposed in parallel relation and extending transversely through said end flanges, and flat portions disposed in parallel relation on each said end flanges to provide a mounting surface for said resistor form.

2. A resistor unit comprising, a resistor form of heat-resistant dielectric material having an intermediate portion between two end flanges, relatively heavy wire prongs molded integral therein and disposed in parallel relation and extending outwardly through said end flanges, relatively light resistance wire wrapped around said intermediate portion, a means at each end of said resistor form for connecting said relatively light resistance wire to said relatively heavy wire prongs, and a means on each said end flanges for mounting said resistor unit so as to minimize rotational motion.

3. A resistor unit as set forth in claim 2 wherein said means at each end of said resistor form for connecting said relatively light resistance wire to said relatively heavy wire prongs comprises loops of the end portions of said light resistance wire being disposed about and soldered to said relatively heavy wire prongs.

4. A resistor unit as set forth in claim 2 wherein said means on each said end flanges for mounting said resistor unit so as to minimize rotational motion comprises flat portions thereon, disposed in parallel relation to provide a mounting surface.

5. A resistor unit comprising, a resistor form of heat-resistant dielectric material having an intermediate portion between two end flanges, relatively heavy wire prongs molded integral therein and disposed in parallel relation and extending diametrically through said end flanges, relatively light resistance wire wrapped around said intermediate portion of said resistor form from substantially one end to the other, loops of each end portions of said relatively light resistance wire disposed about and soldered to one each of said relatively heavy wire to provide an electrical connection, and flat portions disposed in parallel relation on each said end flange to provide for mounting said resistance unit against a printed circuit board.

References Cited in the file of this patent

FOREIGN PATENTS 246,233 Great Britain ___________ Jan. 28, 1926